No. 622,087. Patented Mar. 28, 1899.
C. H. STEARN.
FILAMENT FOR INCANDESCENT ELECTRIC LAMPS.
(Application filed Aug. 11, 1898.)
(No Model.)
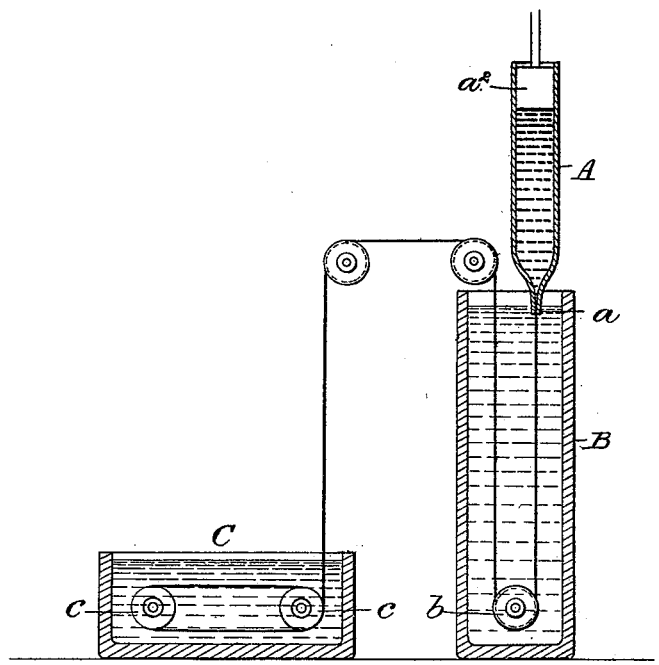

UNITED STATES PATENT OFFICE.

CHARLES H. STEARN, OF LONDON, ENGLAND.

FILAMENT FOR INCANDESCENT ELECTRIC LAMPS.

SPECIFICATION forming part of Letters Patent No. 622,087, dated March 28, 1899.

Application filed August 11, 1898. Serial No. 688,362. (No specimens.)

*To all whom it may concern:*

Be it known that I, CHARLES HENRY STEARN, electrician, a subject of the Queen of Great Britain and Ireland, and a resident of 47 Victoria street, Westminster, London, England, have invented certain new and useful Improvements in the Manufacture of Filaments for Incandescent Electric Lamps, (for which I have applied for patents in Great Britain, Nos. 1,020, 1,021, and 1,022, all dated January 13, 1898,) of which the following is a specification.

The object of my invention is to manufacture a material in filamentary form or in the form of sheets or webs and its application to the making of fabrics and of filaments for incandescent electric lamps and for other purposes. In producing the said material I employ the solution of cellulose known as "viscose" or "cellulose thiocarbonate" and made by treating cellulose with strong alkali and then with carbon bisulfid and dissolving the product in water. A process for the production of such a preparation is described in the specification of British Letters Patent No. 8,700 of 1892.

According to my invention I thoroughly beat and stir the cellulose preparation aforesaid and filter it and subject it to the action of a vacuum, whereby the air and all impurities are removed and the cellulose preparation is brought to a thoroughly homogeneous condition and in a state in which it can be projected through an orifice in the form of a thin thread or filament or in the form of a thin tape or sheet. The cellulose preparation so prepared I then precipitate by projecting it by pressure through an orifice or jet into a precipitating solution or liquid. Alcohol, brine, and sulfate of ammonium, for example, are precipitating liquids or solutions; but I have found that a solution of chlorid of ammonium gives the best results, as it is of a specific gravity which will allow the cellulose solution to pass downward therein and which has the effect of immediately setting the said cellulose solution.

In the accompanying diagram I have illustrated a jet-orifice $a$ at the lower end of a receptacle A, containing the cellulose solution prepared, as aforesaid, by stirring and filtering, so as to render it homogeneous.

$a^2$ represents the hydraulic or other means by which pressure is applied to force the prepared cellulose solution out of the jet into the precipitating solution, such as chlorid of ammonium, in the vessel B. The material is set thereby and is in the form of a filament, web, or sheet, in accordance with the formation of the orifice $a^2$. It may be allowed to lay itself in folds at the bottom of the vessel B or to be so laid by moving the vessel A or the vessel B round and round or from side to side, or it may be passed over roller $b$ and up from the vessel B and be guided over rollers, as shown, down around rollers $c$ $c$ in a vessel C, containing also a precipitating agent. By this arrangement the material is wound in skein form; but it may be wound on a reel or otherwise, and it may, it will be evident, be wound onto rollers or a reel situated in the vessel B instead of in a separate vessel, such as C. By regulating the speed of the winding rollers or reel relatively to the pressure of the pressing device $a^2$ the degree of fineness or thinness of the material can be regulated. By providing a number of jets or orifices more than one filament, web, or sheet can be made at the same time. After precipitation the product can be purified by sulfites or sulfurous acid or by carbonate of soda (washing-soda) or other reagents and be bleached, for instance, with sodium hypochlorite.

If the material is to be used for making fabrics, the mode illustrated is very suitable, as it produces the filaments in skeins; but if the material is to be used for making lamp-filaments it is better not to drag on the material by rollers, but to allow it to be deposited, as hereinbefore described.

If the material is to be produced in the form of sheets, the orifice of the jet will be a thin narrow slit.

In any case the produced material may be reduced, polished, embossed, or otherwise acted upon by passing them through rollers.

I claim—

1. The process of treating a solution of cellulose known as "viscose" for the manufacture of filaments for incandescent electric lamps and similar bodies, consisting in first agitating and filtering the solution, and then projecting it from an orifice of suitable shape into a precipitating solution, substantially as described.

2. The process of treating a solution of cellulose known as "viscose" for the manufacture of filaments for incandescent electric lamps and similar bodies, consisting in first agitating and filtering the solution, and then projecting it from an orifice of suitable shape into a precipitating solution of chlorid of ammonium, substantially as described.

3. The improvement and the manufacture of filaments and similar bodies from a solution of cellulose known as "viscose," consisting in treating the same with chlorid of ammonium for causing it to set, substantially as described.

In testimony whereof I have signed this specification in the presence of two subscribing witnesses.

C. H. STEARN.

Witnesses:
WILLIAM FREDERICK UPTON,
WILLIAM JOHN WEEKS.